United States Patent
Bradley et al.

[11] Patent Number: 5,434,784
[45] Date of Patent: Jul. 18, 1995

[54] VEHICLE STEERING WHEEL POSITION SENSING APPARATUS

[75] Inventors: John R. Bradley, Clarkston; Thomas A. Perry, Washington; Richard E. Teets, Bloomfield Hills; Martin S. Meyer, Southfield; Jeffrey A. Sell, West Bloomfield; Thomas H. Van Steenkiste, Ray, all of Mich.; Frank J. Bohac, Jr., Laguna Hills, Calif.; Jerry S. Roach, Huntington Beach, Calif.; Manfred W. Reissmueller, Orange, Calif.; Everett K. Shelton, Huntington Beach, Calif.; Dozier: James R., San Juan Capistrano, Calif.; Hiro Yamasaki, Palos Verdes Estate, Calif.

[73] Assignees: General Motors Corporation; Hughes Aircraft Company, both of Detroit, Mich.

[21] Appl. No.: 296,553

[22] Filed: Aug. 26, 1994

[51] Int. Cl.$^6$ .............................................. B62D 5/00
[52] U.S. Cl. ................................. 364/424.05; 364/559
[58] Field of Search .................. 364/424.01, 424.05, 364/450, 550, 559; 324/207.2, 207.11, 207.13, 207.21, 207.22, 207.25

[56] References Cited

U.S. PATENT DOCUMENTS

| | | | |
|---|---|---|---|
| 4,803,629 | 2/1989 | Noto et al. | 364/424.05 |
| 5,065,324 | 11/1991 | Oshita et al. | 364/424.05 |
| 5,089,060 | 2/1992 | Bradley et al. | 148/103 |
| 5,091,021 | 2/1992 | Perry et al. | 148/103 |
| 5,130,650 | 7/1992 | Lemarquand | 324/207.22 |
| 5,283,740 | 2/1994 | Sato et al. | 364/424.05 |

Primary Examiner—Michael Zanelli
Attorney, Agent, or Firm—Timothy G. Gorbatoff

[57] ABSTRACT

This invention relates to an apparatus for sensing a vehicle steering wheel position. A permanent magnet target wheel having a global axial magnetic field normal to a first surface is attached to a steering shaft which is rotated by the steering wheel. Multiple regions equally spaced along a common radius on the first surface are magnetically altered and sensed by magnetically responsive sensors positioned adjacent the first radius. A single region positioned within a finite radius along a second radius on the first surface is magnetically altered and sensed by a magnetically responsive sensor positioned adjacent the second radius. The magnetic sensors are responsive to passage of the multiple regions and single region as the target wheel is rotated. Detection of each of the multiple regions corresponds to rotation of the target wheel by an incremental number of degrees. Detection of the single region corresponds to a target wheel position within a predetermined angular range, referred to as the center position. A turn counter is utilized to determine which of the center positions corresponds to the steering wheel neutral position.

4 Claims, 4 Drawing Sheets

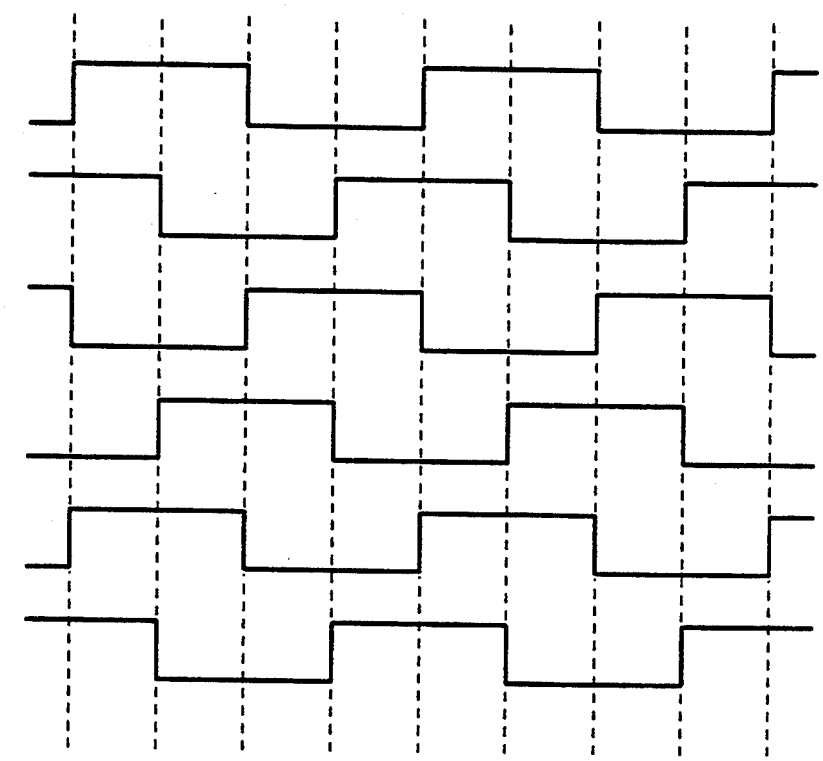
FIG. 8A
FIG. 8B
FIG. 8C
FIG. 8D
FIG. 8E
FIG. 8F
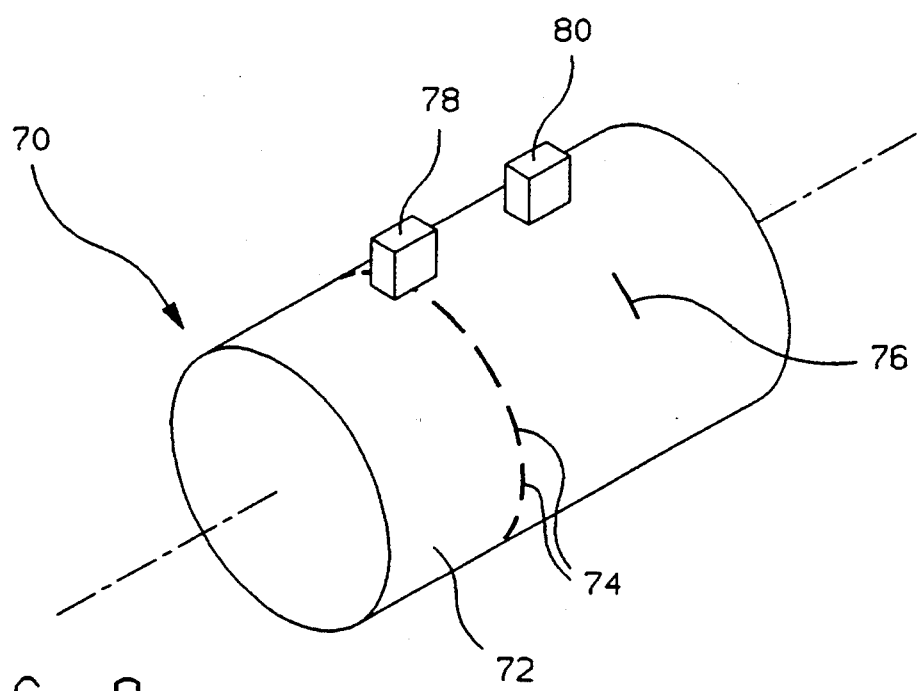
FIG. 9

VEHICLE STEERING WHEEL POSITION SENSING APPARATUS

This invention relates to an apparatus for sensing a vehicle steering wheel position, and more particularly, to a steering wheel position apparatus which magnetically senses a center position, incremental angular rotation, and a neutral position of the steering wheel.

BACKGROUND OF THE INVENTION

Steering wheel position sensors are employed by vehicle controllers for determining the angular position and rotational speed of the steering wheel. Steering wheel angle and speed information have application to various vehicle systems. For example, it has been proposed to utilize vehicle steering wheel angle for anti-lock braking and active suspension systems for enabling such control systems to alter their operation in response to vehicle turning.

Magnetic position sensors are commonly used as steering wheel position sensors. They require cooperating elements including a magnetic field, a movable target wheel and one or more stationary sensors. Movement of the target wheel produces variations in the flux density of the magnetic field as detected by the sensor.

Target wheels formed of ferromagnetic material, usually soft steel, are not capable of producing the required magnetic field. Therefore, a separate biasing magnet is required to generate the magnetic field through which the target wheel is rotated. Changes in the magnetic field caused by movement of the target wheel are sensed by a Hall effect or magnetoresistive sensor, providing an indication of angular movement of the target wheel.

It is desirable to have a simpler configuration of cooperating elements whereby the required variable magnetic field is produced by the target wheel, thereby eliminating the need for a separate biasing magnet. Movement of the target wheel with respect to the stationary sensor causes variations in the magnetic field density as detected by the sensor. By eliminating the need for a separate biasing magnet, the size and cost of the sensing apparatus can be substantially reduced. The magnetized target wheel can also produce larger signals with higher spatial resolution compared to a ferromagnetic target wheel with a bias magnet.

SUMMARY OF THE INVENTION

The present invention is directed to an apparatus for sensing a vehicle steering wheel position. Appropriate on-board vehicle controllers utilize this information in determining the angular position of the steering wheel.

A target wheel is attached to and rotated by a steering shaft which is, in turn, attached to and rotated by the steering wheel—the target wheel and steering wheel shaft being coupled and thereby rotating in unison. The target wheel is formed of a permanent magnet material having a generally uniform first surface with a global axial magnetic field of a first polarity normal to the first surface.

Multiple regions on the first surface, equally spaced along a first radius, are magnetically altered and sensed by magnetically responsive sensors positioned adjacent the first radius. Detection of passage of each of the multiple regions adjacent the first sensor corresponds to rotation of the target wheel by an incremental number of degrees.

A single region on the first surface within a finite arc along a second radius is magnetically altered and sensed by a magnetically responsive sensor positioned adjacent the second radius. Detection of the single region adjacent the second sensor corresponds to a target wheel position within a predetermined angular range, referred to as the steering wheel center position.

A turn counter is utilized to determine which of the steering wheel center positions corresponds to its neutral position, the neutral position corresponding to the position of the steering wheel resulting in a straight direction of vehicle travel.

By forming a rotating target wheel from a permanent magnet material and magnetically altering regions along its surface, a target wheel emanating a variable magnetic field is obtainable. This eliminates the need for a separate biasing magnet.

BRIEF DESCRIPTION OF THE DRAWINGS

FIGS. 8A–F illustrate graphs of binary signals generated by the digital circuit of FIG. 7.

FIG. 9 illustrates an alternative embodiment of the target wheel of FIG. 1, encoded in accordance with the present invention.

DETAILED DESCRIPTION OF THE PREFERRED EMBODIMENT

Figure 1:
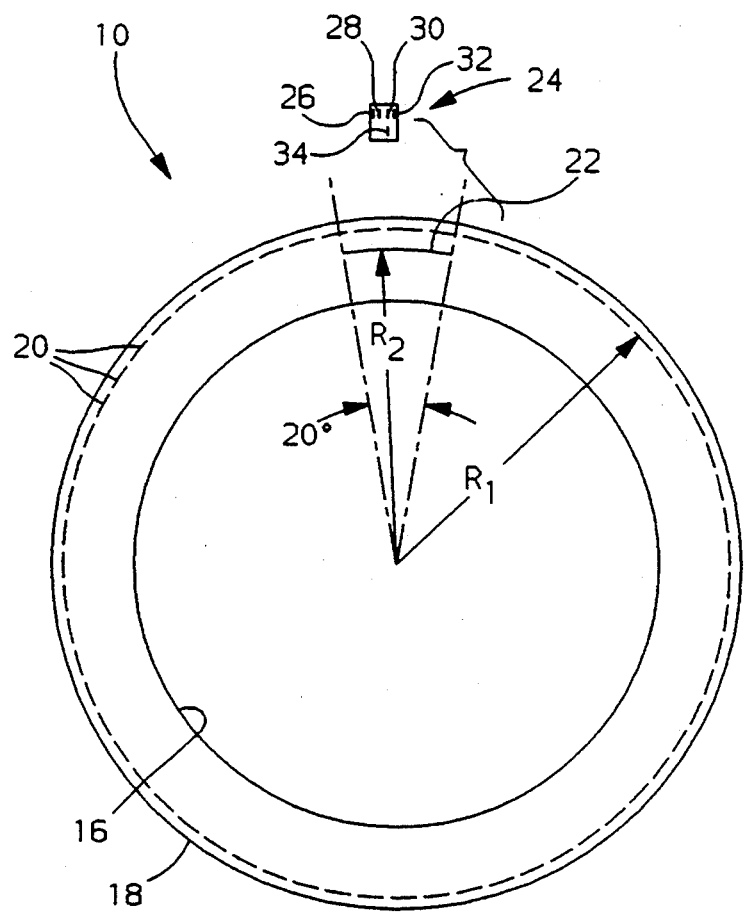
FIG. 1 illustrates a plan view of a permanent magnet target wheel encoded in accordance with the present invention.
Figure 2:
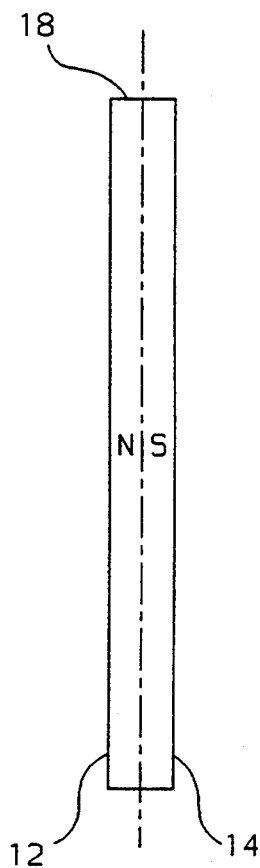
FIG. 2 illustrates a side view of the target wheel of FIG. 1.

Referring now to the drawings, and more particularly to FIGS. 1 and 2, reference numeral 10 generally designates a target wheel attached to and rotated by a vehicle steering wheel shaft. The steering wheel shaft being further attached to and rotated by the vehicle steering wheel. The steering wheel and target wheel 10 thereby being coupled and rotating in unison.

The target wheel 10 of the preferred embodiment is defined by generally parallel first 12 and second 14 surfaces, and inside 16 and outside 18 concentric circular surfaces to form a disk-like ring shape. The target wheel 10 is formed of a permanent magnet material which is globally magnetized with an axial homopolar magnetic field normal to the first surface 12. The first surface 12 having a first magnetic polarity (e.g., N-pole) and the second surface 14 having an opposing second magnetic polarity (e.g., S-pole).

The first surface 12 comprises (i) multiple regions 20 equally spaced along a common first radius $R_1$ which have been magnetically altered, and (ii) a single region 22 within a finite arc along a second radius $R_2$ which has been magnetically altered. Magnetically altering regions 20 and 22 is achieved during manufacture of the permanent magnet target wheel 10 by heating the first surface of the target wheel within the localized regions 20 and 22, which may extend to some unspecified depth below the first surface 12, with a directed energy beam, e.g., a laser beam. The temperature to which the regions are heated will affect the nature of the magnetic alteration.

If the regions are heated to above the Curie temperature ($T_c$), the volume of permanent magnet material heated will reach a paramagnetic state whereby the magnetic moment of the heat-affected volume is free to rotate. Upon cooling, the heat affected volume is once again magnetized, but with the second polarity of the opposing second surface 14. The heat-affected regions 20 and 22 have therefore been magnetically altered and differ in polarity from the remaining permanent magnet material forming the first surface 12. This magnetic alteration results in a magnetic field variation along the first surface 12 within the regions 20 and 22, detectable by adjacent magnetically responsive sensors.

Alternatively, heating the regions to a maximum temperature less than the Curie Temperature will magnetically alter the regions by reducing the magnitude of the corresponding magnetic flux emanating from the regions 20 and 22, the reduction in flux being detectable by adjacent sensors.

The process of laser encoding regions on a permanent magnet material is further defined in U.S. Pat. Nos. 5,089,060 to Bradley et al. issued Feb. 18, 1992, entitled "Thermomagnetically Patterned Magnets And Method Of Making The Same" and 5,091,021 to Perry et al. issued Feb. 25, 1992, entitled "Magnetically Coded Device And Method Of Manufacture", both assigned to the assignee of the present invention. This process allows for rapid, highly accurate formation of complex patterns to be encoded onto the surface of a permanent magnet target wheel.

Magnetic altering could also be achieved by removing permanent magnet material from the first surface of the target wheel located within the regions 20 and 22 by laser cutting groves or apertures. Or alternatively, by forming the target wheel with the grooves or apertures during manufacture. The reduction in permanent magnet material within the regions 20 and 22 provides for a correspondingly reduced magnetic flux emanating from the regions, detectable by adjacent sensors. The reduction in permanent magnet material also increases the sensor-to-surface air gap, further reducing the magnetic flux to which the adjacent sensors are subjected.

By forming the rotating target wheel from a permanent magnet material and magnetically altering regions along the first surface, a target wheel which emanates a variable magnetic field is obtainable. This eliminates the need for a separate biasing magnet.

A sensor package 24 is positioned adjacent the first surface 12 of the target wheel 10. The sensor package 24 contains five magnetic flux sensing elements 26, 28, 30, 32 and 34, such as Hall effect or magnetoresistive elements. Four of the elements 26, 28, 30 and 32 are positioned adjacent to the first radius $R_2$ and are responsive to passage of the multiple regions 20. Only one magnetic sensing element is required, but additional elements are employed in the preferred embodiment for improved resolution and signal accuracy, as will be described in further detail below with regards to FIGS. 7 and 8. One magnetic flux sensing element 34 is positioned adjacent to the second radius $R_2$ and is responsive to passage of the single region 22.

The magnetic sensing elements 26, 28, 30, 32 and 34 have a parameter, such as resistance, which varies in the presence of a varying magnetic flux density. As the target wheel 10 is rotated, passage of the magnetic regions 20 and 22 adjacent the respective sensing elements causes a change in the magnetic flux density to which the sensing elements are subjected. This varying flux density causes a variation in the sensing element parameter, which is converted into a varying analog voltage signal by methods (e.g., use of constant current sources) well known to those skilled in the art.

Figure 3:
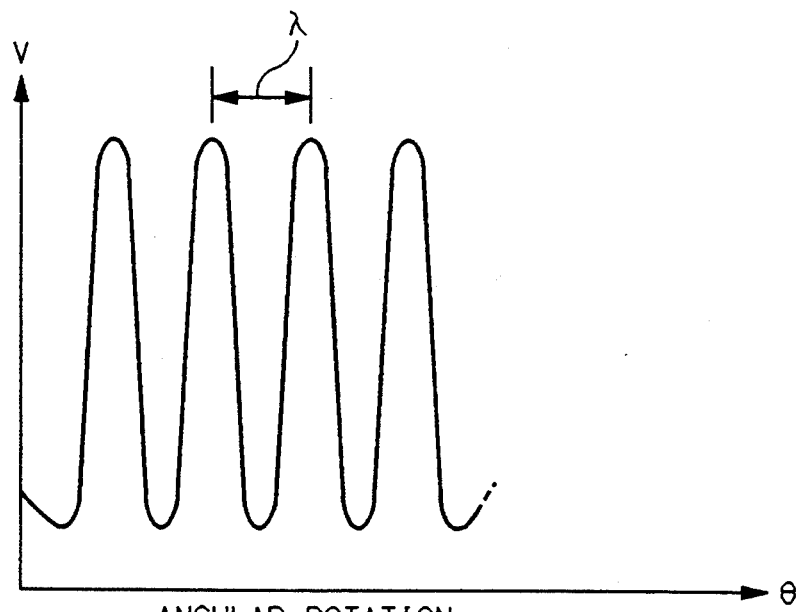
FIG. 3 illustrates a graph of a typical magnetic sensing element analog output voltage signal detecting the presence of adjacent magnetically-altered regions positioned along a first radius of the rotating target wheel.

A typical analog output voltage signal of one of the sensing elements 26, 28, 30 and 32 detecting passage of the multiple regions 20 is illustrated in FIG. 3. Rotation of the target wheel 10 results in a generally sinusoidal analog output voltage signal with a wavelength $\lambda$ equal to rotation of the target wheel by an incremental number of degrees, equal to 360° divided by the total number of multiple regions 20.

Figure 4:
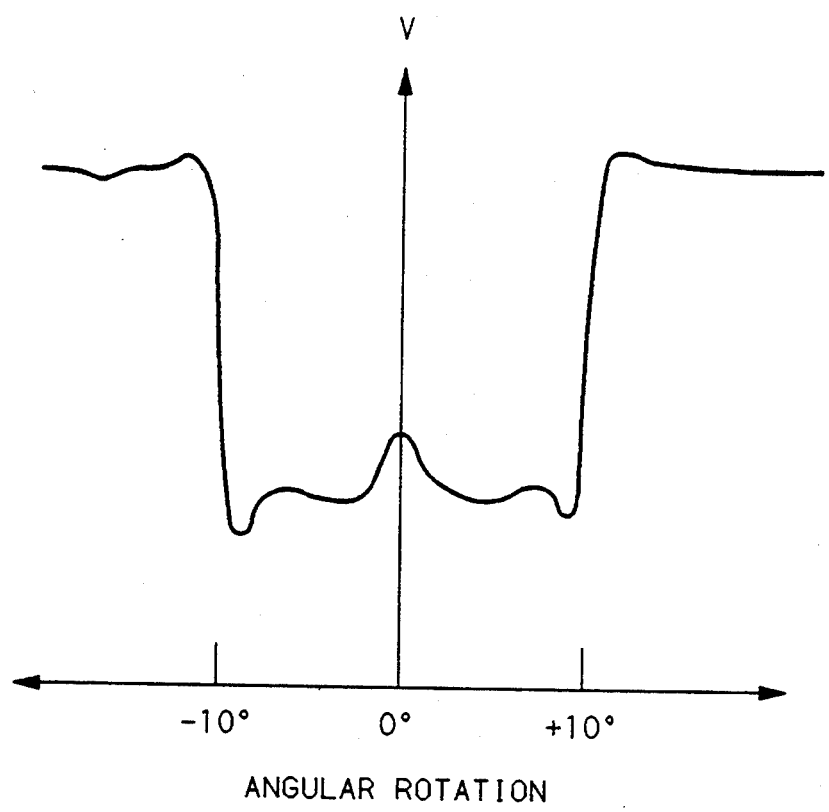
FIG. 4 illustrates a graph of a typical magnetic sensing element analog output voltage signal detecting the presence of an adjacent magnetically-altered region positioned along a second radius of the rotating target wheel.

A typical analog output voltage signal of sensing element 34 detecting passage of the single region 22 is illustrated in FIG. 4. The analog output voltage of sensing element 34 is generally constant, except for a voltage dip which corresponds to passage of a reduced flux within the single region 22 adjacent the sensing element 34.

Referring back to FIG. 1, detection by sensing elements 26, 28, 30 and 32 of an adjacent multiple region 20 as the target wheel is rotating corresponds to rotation of the target wheel 10 by an incremental number of degrees. The more regions encoded along the target wheel, the finer the resolution of the apparatus.

Detection by sensing element 34 of an adjacent single region 22 corresponds to a target wheel position within a predetermined angular range, referred to as the center position of the steering wheel. Detection of the center position will occur each 360° rotation of the steering wheel.

Figure 5:
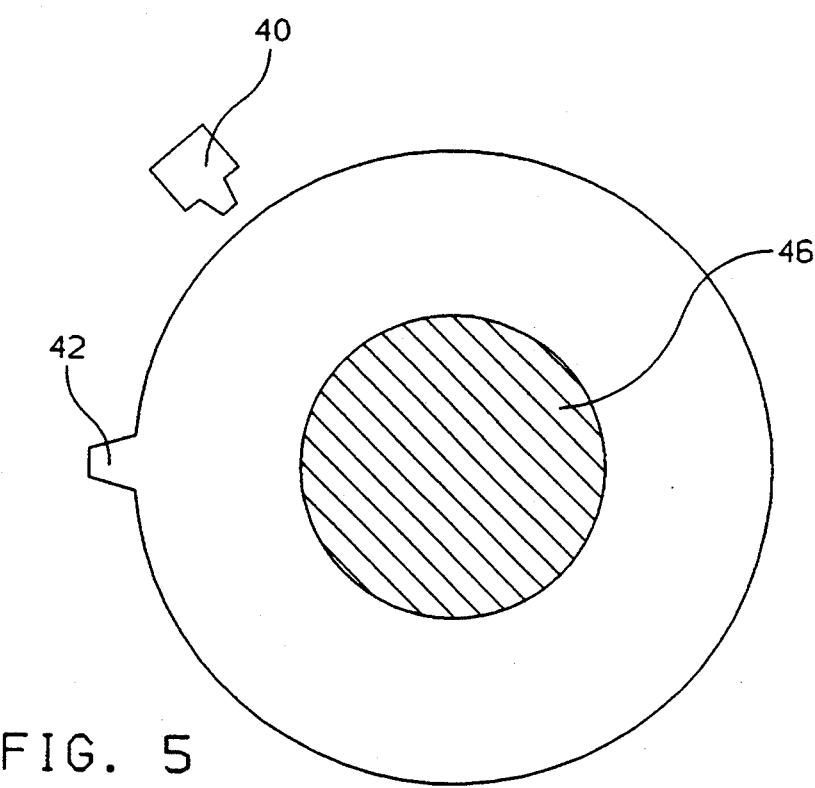
FIG. 5 illustrates a gear tooth driven counter for detection of the number and direction of complete rotations of the target wheel.

An additional feature of the apparatus of the present invention is its ability to determine which of the steering wheel center positions is the neutral position. As illustrated in FIG. 5, this is achieved by means of a gear driven turn counter 40 indexed to each next position by a single gear tooth 42 attached to and rotated by the steering wheel shaft 46. Each position of the turn counter 40 results in an output of a unique, discrete voltage.

Passage of the gear tooth 42 in a first rotational direction results in an incremental output voltage increase. Passage of the gear tooth 42 in a second rotational direction results in an incremental output voltage decrease. In this way, the output voltage of the turn counter 40 continually corresponds to the number and direction of complete 360° rotations of the target wheel 10.

The position of the steering wheel which aligns the single region 22 adjacent sensor 34, while no complete rotations of the steering wheel are being indicated by the turn counter 40, corresponds to the steering wheel neutral position. The steering wheel has only one neutral position, which typically corresponds to the angular position of the steering wheel resulting in a straight direction of vehicle travel.

Although a gear tooth driven turn counter is employed in the preferred embodiment, alternatively, a magnetically actuated turn counter could be utilized in conjunction with the existing or a separate encoded target wheel to perform the same operation.

Figure 6:
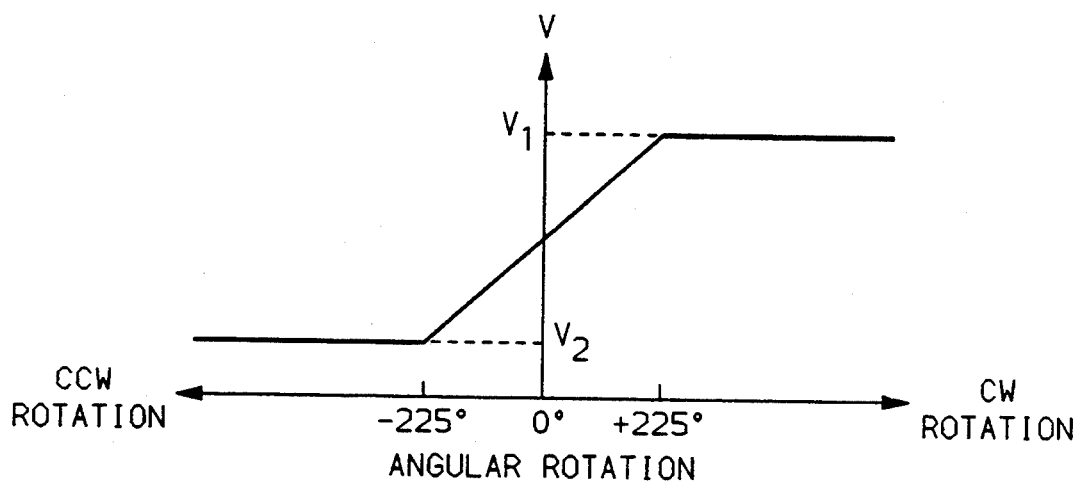
FIG. 6 illustrates a voltage output signal of an alternative embodiment of the turn counter of FIG. 5.

Yet another alternative embodiment of the turn counter of FIG. 5 is a potentiometer-type device which outputs an analog voltage varying linearly between a first and second voltage potential for a predetermined range of angular rotation of the target wheel. The output voltage signal of such a turn counter is illustrated in FIG. 6. Angular rotations between ±225° of a center 0° position result in a linearly varying voltage between a first $V_1$ and second $V_2$ voltage potential. Angular rotations in a first clockwise direction exceeding +225° results in a constant output of the first voltage $V_1$. Angular rotations in a second counterclockwise direction exceeding −225° results in a constant output of the second voltage $V_2$. The position of the steering wheel which aligns the single region 22 adjacent sensor 34, while the output voltage of the turn counter is between the first $V_1$ and second $V_2$ voltage potentials corresponds to the steering wheel neutral position.

The output voltage of any of the above described turn counters also provides a means during initial start up of the vehicle (commonly referred to as "key-on") for determining whether the angular position of the steering wheel is within a predetermined range.

Figure 7:
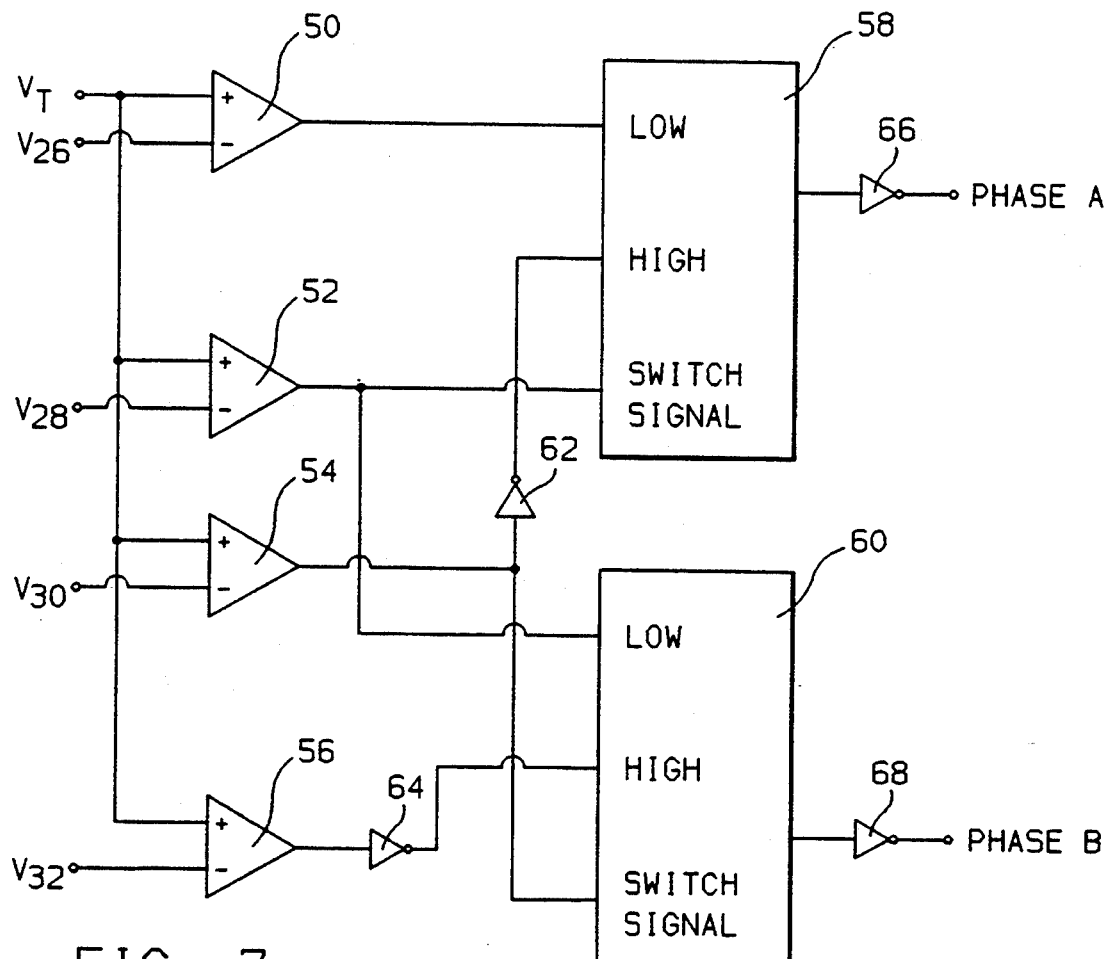
FIG. 7 illustrates a digital circuit for converting the analog output voltage signals of FIG. 3 into two symmetrical square wave binary signals.

FIG. 7 illustrates a digital circuit used for processing the analog output voltage signals of sensors 26, 28, 30 and 32, representatively illustrated 5in FIG. 3, to produce binary signals for use by on-board vehicle controllers in determining the angular position and incremental angular rotation of the steering wheel. The digital circuit comprises (i) comparators 50, 52, 54 and 56, (ii) switches 58 and 60, and (iii) inverters 62, 64, 66 and 68.

The average voltage of the four sensing elements 26, 28, 30 and 32 provide a nearly constant voltage, independent of temperature, stray electromagnetic fields and electrical noise. This average voltage is used as a threshold reference Vt by comparators 50, 52, 54 and 56 for converting the analog output voltage signals into the binary signals illustrated in FIGS. 8A, 8B, 8C and 8D, respectively.

All voltages of the sensor analog output signals $V_{26}$, $V_{28}$, $V_{30}$ and $V_{32}$ greater than the threshold voltage Vt result in a binary high output (e.g., +5 V). All voltages of the sensor analog output signals less than the threshold voltage result in a binary low output (e.g., 0 V).

The sensing elements are spaced within the sensing package 24 such that passage of each of the multiple regions 20 adjacent the sensing package 24 will be sequentially sensed by the magnetic sensing elements. The spacing of the sensing elements 26, 28, 30 and 32 is such that their analog output voltage signals, and therefore their corresponding binary signals, are sequentially phase-shifted by one-quarter wavelength. The one-quarter phase-shifting results in both the analog output voltages and binary signals of sensor 26 being mirror-images (i.e., 180 electrical degrees out of phase) of the corresponding analog and binary signals of sensor 30. Similarly, the corresponding analog and binary signals of sensors 28 and 30 are likewise mirror-images of each other.

The binary signals of sensors 26 and 30, and the inverted binary signals of sensors 28 and 32 are subsequently utilized by two switches 58 and 60 for generating two symmetrical square wave binary signals, referred to as "Phase A" and "Phase B" and illustrated in FIGS. 8E and 8F, respectively, for use by appropriate on-board vehicle controllers.

Referring to FIG. 7, switch 58 is controlled by the binary signal of sensor 28. When the binary signal of sensor 28 is high (e.g., +5 V), the output of switch 58 (Phase A) is the inverted binary signal of sensor 30. Conversely, when the binary signal of sensor 28 is low (e.g., 0 V), the output of switch 58 (Phase A) is the binary signal of sensor 26. The output of switch 58 is subsequently inverted, resulting in the binary signal illustrated in FIG. 8E.

Likewise, switch 60 is controlled by the binary signal of sensor 30. When the binary signal of sensor 30 is high, the output of switch 60 (Phase B) is the inverted binary signal of sensor 32. Conversely, when the binary signal of sensor 30 is low, the output of switch 60 (Phase B) is the binary signal of sensor 28. The output of switch 60 is thereafter inverted, resulting in the binary signal illustrated in FIG. 8F. The symmetrical square wave binary signals of FIGS. 8E and 8F are phase shifted 90 electrical degrees with respect to one another.

The above digital circuit provides a means for generating two binary signals which are symmetrical square waves, even though the original analog and binary signals may have been unsymmetrical. The rising and falling edges of the two binary signals of FIGS. 8E and 8F correspond to rotation of the target wheel by an incremental number of degrees.

An alternative embodiment of a target wheel in accordance with the present invention is illustrated in FIG. 9. The target wheel 70 comprises a cylindrical shape having a generally uniform outer surface 72 with multiple magnetically altered regions 74 along a first track, and a single magnetically altered region 76 within a finite arc along a second track. Magnetic sensors 78 and 80 are positioned adjacent respective tracks for providing binary signals as those illustrated in FIGS. 8A–F for the preferred embodiment.

While the present invention has been described in reference to the illustrated embodiments, it will be recognized that various modifications will occur to those skilled in the art. In this regard, it will be understood that an apparatus incorporating such modifications may fall within the scope of this invention, which is defined by the appended claims.

The embodiments of this invention in which an exclusive property or privilege is claimed are defined as follows:

1. An apparatus for sensing a vehicle steering wheel position, the apparatus comprising:
    a permanent magnet target wheel rotated by the steering wheel, the target wheel having (i) a generally uniform first surface, (ii) a global axial magnetic field of a first polarity normal to the first surface, (iii) multiple magnetically altered regions equally spaced along a first radius, and (iv) a single magnetically altered region within a finite arc along a second radius;
    a first sensor positioned adjacent the first surface and responsive to passage of the multiple regions, passage of each of the multiple regions corresponding to rotation of the target wheel by an incremental number of degrees;
    a second sensor positioned adjacent the first surface and responsive to passage of the single region, alignment of the single region adjacent the second sensor corresponding to a range of absolute angular positions of the target wheel;

an element rotated by the steering wheel; and a counter having an output voltage, the counter being positioned so as to be responsive to passage of the element as it rotates, passage of the element in a first rotational direction resulting in an incremental voltage increase, passage of the element in a second rotational direction resulting in an incremental voltage decrease, the output voltage of the counter corresponding to the number and direction of complete 360° rotations of the target wheel.

2. The vehicle steering wheel position sensing apparatus according to claim 1, wherein a neutral position of the target wheel corresponds to the position of the steering wheel which aligns the single region adjacent the second sensor while no complete rotations of the steering wheel are being indicated by the counter.

3. An apparatus for sensing a vehicle steering wheel position, the apparatus comprising:

a permanent magnet target wheel rotated by the steering wheel, the target wheel having (i) a generally uniform first surface, (ii) a global axial magnetic field of a first polarity normal to the first surface, (iii) multiple magnetically altered regions equally spaced along a first radius, and (iv) a single magnetically altered region within a finite arc along a second radius;

a first sensor positioned adjacent the first surface and responsive to passage of the multiple regions, passage of each of the multiple regions corresponding to rotation of the target wheel by an incremental number of degrees;

a second sensor positioned adjacent the first surface and responsive to passage of the single region, alignment of the single region adjacent the second sensor corresponding to a range of absolute angular positions of the target wheel;

means for producing an output voltage which varies linearly between a first and second voltage potential for all angular positions of the target wheel within the predetermined angular range defined by a first and second limit;

means for producing the first voltage potential for all angular positions of the target wheel greater than the first limit of the predetermined range; and means for producing the second voltage potential for all angular positions of the target wheel less than the second limit of the predetermined range.

4. The vehicle steering wheel position sensing apparatus according to claim 3, wherein a neutral position of the target wheel corresponds to the position of the steering wheel which aligns the single region adjacent the second sensor while the output voltage is between the first and second voltage potentials.

* * * * *